(12) United States Patent
Park et al.

(10) Patent No.: US 10,804,524 B2
(45) Date of Patent: Oct. 13, 2020

(54) CONTROLLING STRUCTURES OF BATTERY ELECTRODES

(71) Applicant: The Curators of the University of Missouri, Columbia, MO (US)

(72) Inventors: Jonghyun Park, Rolla, MO (US); Jie Li, Rolla, MO (US)

(73) Assignee: The Curators of the University of Missouri, Columbia, MO (US)

( * ) Notice: Subject to any disclaimer, the term of this patent is extended or adjusted under 35 U.S.C. 154(b) by 176 days.

(21) Appl. No.: 16/190,432

(22) Filed: Nov. 14, 2018

(65) Prior Publication Data

US 2019/0148709 A1    May 16, 2019

Related U.S. Application Data

(60) Provisional application No. 62/585,859, filed on Nov. 14, 2017.

(51) Int. Cl.
| | | |
|---|---|---|
| *H01M 4/04* | (2006.01) | |
| *H01M 4/131* | (2010.01) | |
| *H01M 4/505* | (2010.01) | |
| *H01M 4/1391* | (2010.01) | |
| *H01M 4/139* | (2010.01) | |
| *H01M 4/02* | (2006.01) | |

(52) U.S. Cl.
CPC ....... *H01M 4/0409* (2013.01); *H01M 4/0404* (2013.01); *H01M 4/131* (2013.01); *H01M 4/139* (2013.01); *H01M 4/1391* (2013.01); *H01M 4/505* (2013.01); *H01M 2004/028* (2013.01)

(58) Field of Classification Search
CPC .... H01M 4/0409; H01M 4/139; H01M 4/131; H01M 4/0404; H01M 4/505; H01M 4/1391
See application file for complete search history.

(56) References Cited

U.S. PATENT DOCUMENTS

| | | | | |
|---|---|---|---|---|
| 2013/0316245 A1* | 11/2013 | Buchanan | ........... | H01M 4/0457 429/232 |
| 2015/0221929 A1* | 8/2015 | Lu | ........... | H01M 4/624 429/218.1 |
| 2018/0287194 A1* | 10/2018 | Chae | ........... | H01M 4/382 |

* cited by examiner

*Primary Examiner* — Stewart A Fraser
(74) *Attorney, Agent, or Firm* — Stinson LLP

(57) ABSTRACT

Manufacturing an electrode by forming an electrode structure on a grounded conductive substrate and applying a voltage across the electrode structure to generate an electric field through the electrode structure to arrange the dipolar particles within the electrode structure.

20 Claims, 15 Drawing Sheets

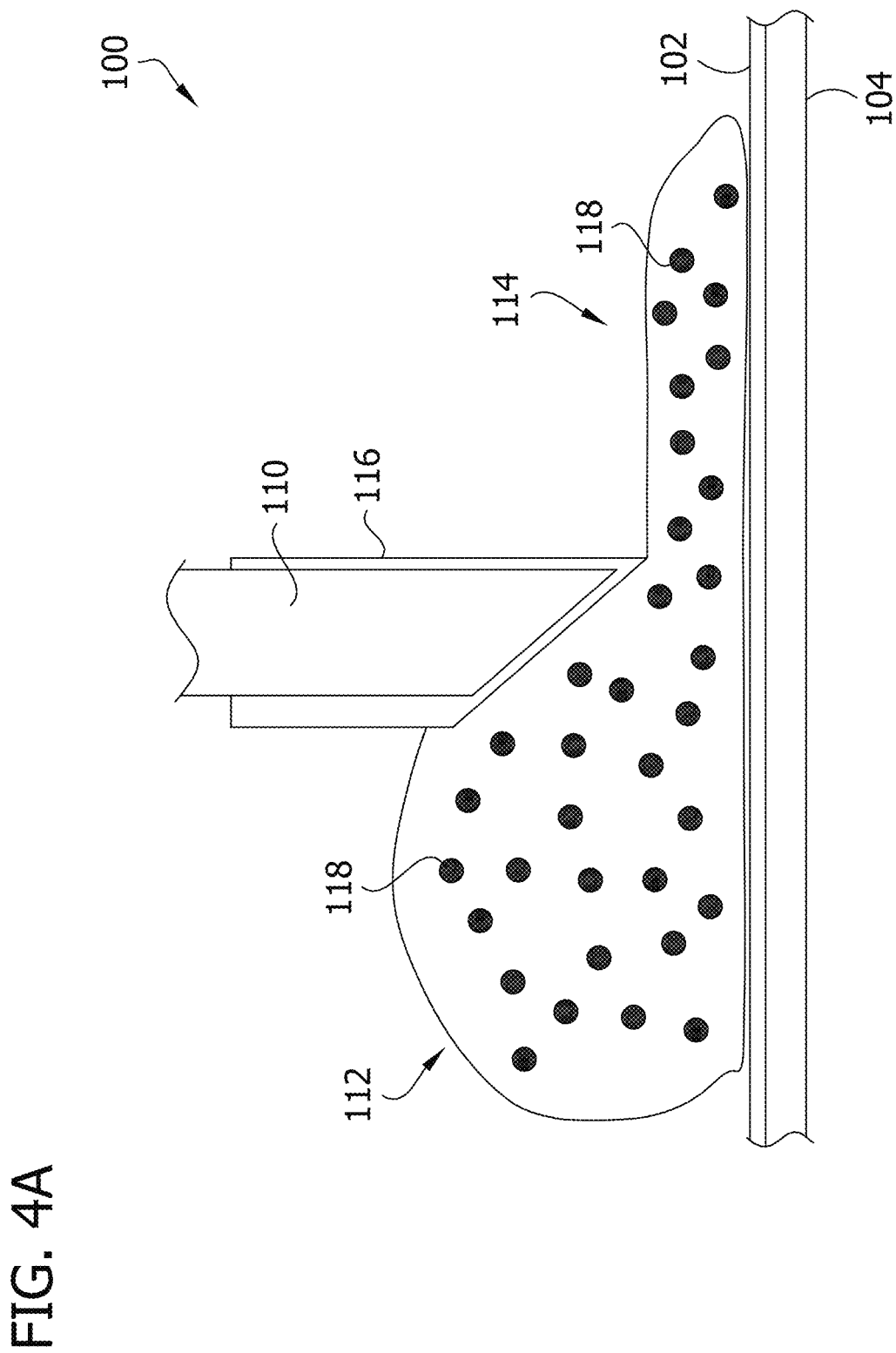

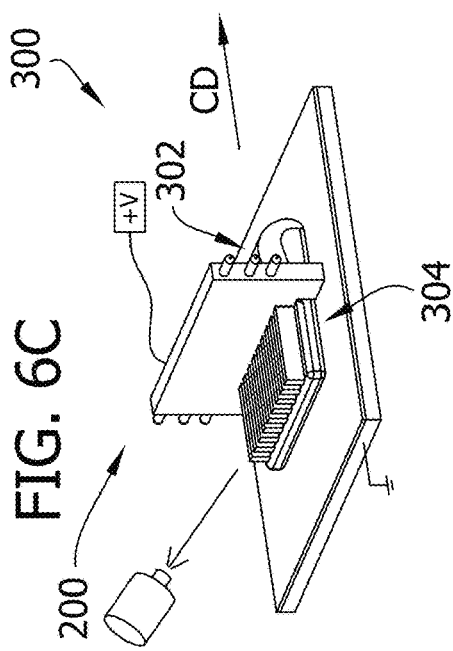
FIG. 6A
FIG. 6B
FIG. 6C
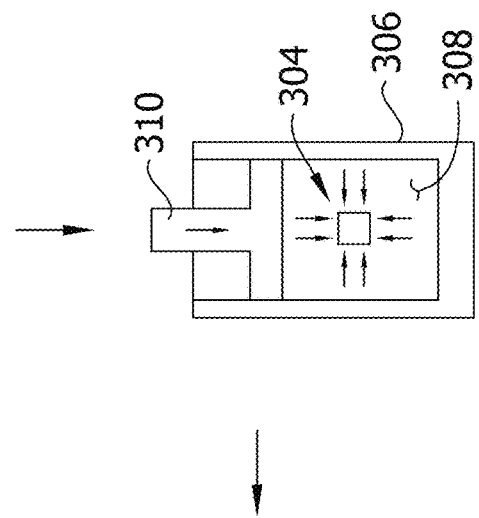
FIG. 6D
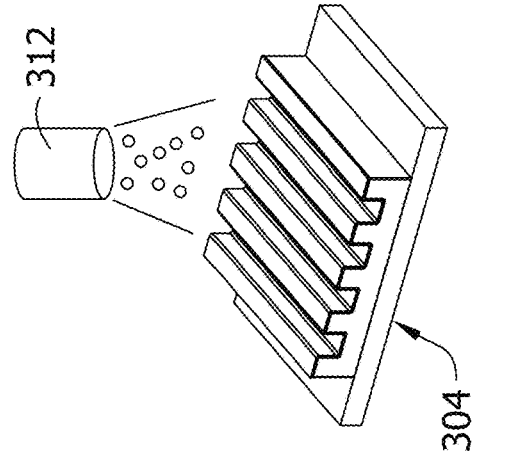
FIG. 6E
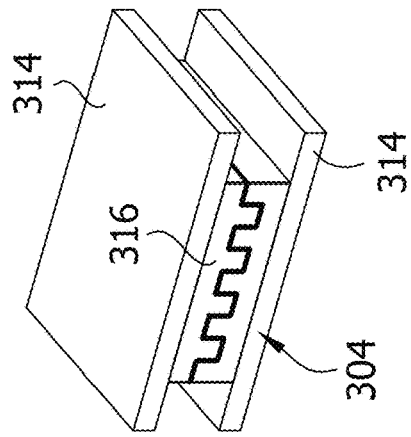
FIG. 6F

US 10,804,524 B2

CONTROLLING STRUCTURES OF BATTERY ELECTRODES

CROSS-REFERENCE TO RELATED APPLICATION

The present application claims the benefit of U.S. Provisional Application No. 62/585,859, filed Nov. 14, 2017, the entirety of which is hereby incorporated by reference.

BACKGROUND

Modern battery cells are fabricated by casting slurries, also known as ink or paste, with randomly distributed particles onto current collectors in the form of laminated structures. A random structure of this type has a high likelihood of degrading battery performance because its randomness can result in an extremely weak spot that in turn can create a bottle-neck for transport. Also, some particles (e.g., active particles or additive particles) can form an isolated group within the network and, consequently, the particles cannot perform their essential duty. Instead, the isolated group hinders the transport of species (e.g., ions). Further, a random structure can cause a longer path for transport.

SUMMARY

Aspects of the invention relate to methods of making battery electrodes to address present energy storage technology gaps and to meet future energy storage requirements. A well-organized structure can provide better response and performance (compared to a randomly distributed structure) because it enhances the transport of species and minimizes any bottle-neck that might result from the limitations caused by randomness in certain regions. In an aspect, an electric field (EF) is used to control electrode microstructures during manufacture of the electrodes by, for example, tape casting. In another aspect, electrode microstructures and macrostructures are simultaneously controlled. According to this other aspect, the EF is used to control the microstructures while additive manufacturing provides control of three-dimensional (3-D) macrostructures and the integration of both micro and macro scales. Controlling microstructures, as well as synergistically controlling micro/macrostructures, during energy material processing advantageously provides unprecedented control of electrode structures and enhances performance, resulting in electrodes that exhibit superior performance in the specific capacity, areal capacity, and cycle life.

In one aspect, a method of manufacturing an electrode includes grounding a conductive substrate and forming an electrode structure on the substrate. The electrode structure comprises a cathode material having dipolar particles. The method also includes applying a voltage across the electrode structure to generate an electric field through the electrode structure to arrange the dipolar particles relative to one another within the electrode structure.

In another aspect, a system for manufacturing an electrode comprises a grounded conductive substrate and a doctor blade. The doctor blade is configured for tape casting a paste onto the substrate to form an electrode structure, which comprises a cathode material having dipolar particles. The doctor blade is electrically connected to a power supply for applying a voltage across the doctor blade and the substrate to generate an electric field through the electrode structure to arrange the dipolar particles relative to one another within the electrode structure.

In another aspect, an electrode for a battery comprises a tape casted cathode material including dipolar particles arranged within the cathode material by an externally applied electric field to form a series of chains that are generally parallel with one another.

Other objects and features will be in part apparent and in part pointed out hereinafter.

BRIEF DESCRIPTION OF THE DRAWINGS

FIG. 4A is an enlarged cross-section of a tape casting system according to another embodiment of the present disclosure, the tape casting system manufacturing an electrode structure without applying an electric field.

FIGS. 6A-6F illustrate a micro slurry casting process for forming electrode structures utilizing the tape casting system of FIG. 5A according to one embodiment of the present disclosure.

Corresponding reference characters indicate corresponding parts throughout the drawings.

DETAILED DESCRIPTION

Figure 1:
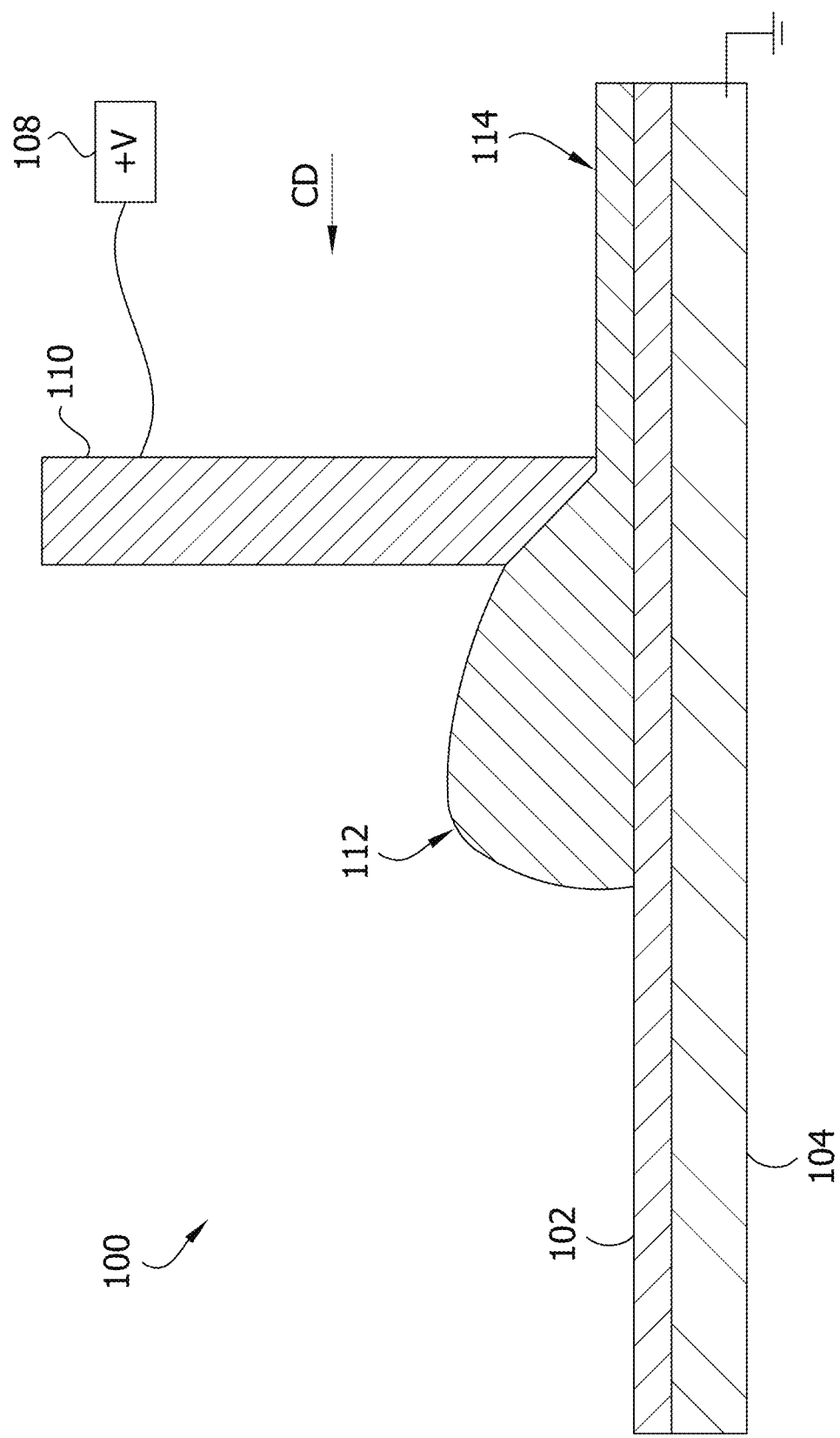
FIG. 1 is a cross-section of a tape casting system according to one embodiment of the present disclosure.

An electric field treatment on a battery electrode according to embodiments of the invention comprises applying an electric field to an electrode before, during and/or after electrode fabrication. The electric field treatment manipulates the microstructure of the electrode by changing the internal particle or molecule orientation and distribution within the electrode, which leads to an increase in the electrode's inner surface area and a reduction in weak spots and isolated particle groups, resulting in improved battery performance. Increasing the electrode's inner surface area increases the electrode's porosity (e.g., the amount of internal voids within the electrode) which increases the amount of an electrolyte in contact with electrode. This results in the faster transportation of electrons inside the electrode to improve battery performance. This electric field treatment is an economical and environmentally friendly technology for micro-nano level structure fabrication and can be combined with conventional tape casting, additive manufacturing, or other electrode fabrication technologies and techniques.

In terms of controlling battery structure, battery electrodes with 3-D nanoarchitectures (e.g., nanotubes) have been successfully synthesized for almost two decades. Compared to some nanomanufacturing methods (e.g., lithography tools), which are expensive and time-consuming, tape casting is preferred and has been used commercially for lithium-ion battery (LIB) fabrication for decades. In addition, for LIB applications, the use of paste chemical components is a critical factor in battery performance because the presence of excessive binders in the paste can decrease ionic and electronic conductivity. In this respect, tape casting of pastes has the advantage that it does not mix unnecessary components in the pastes.

Advantageously, aspects of the present disclosure improve upon conventional electrode manufacturing processes by applying an electric field to the electrode structure during fabrication to manipulate the electrode structure on a particle microstructure level. When an electric field is applied during the manufacture of an electrode structure, the electric field creates organized microstructures within the electrode structure. Specifically, upon the application of an electric field, the dipolar particles of the cathode material comprising the electrode structure rearrange themselves relative to one another (e.g., move, rotate, transverse, etc.) within the cathode material to form one or more chains or lines within the electrode structure (broadly, form an order particle network within the electrode structure). These chains are generally parallel with one another and with the direction of the applied electric field. By organizing and arranging the dipolar particles into a series of chains within the cathode material, the surface area of the dipolar particles is increased and the number of weak spots and isolated particle groups are reduced, enhancing the performance of the electrode in the battery. One example of a dipolar particle in a cathode material is $LiMn_2O_4$ (LMO), although the use of other cathode/anode materials and particles are within the scope of the present disclosure.

Figure 11A:
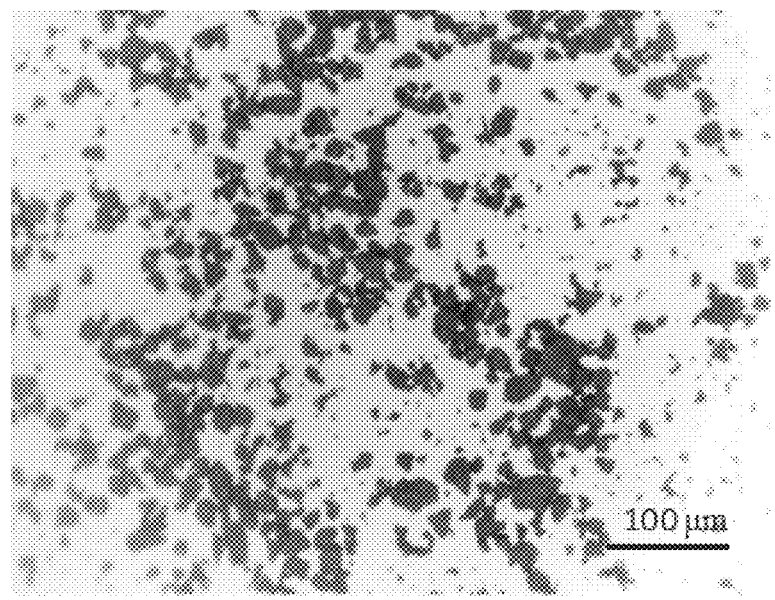
FIGS. 11A and 11B are microscopic images of an exemplary arrangement of dipolar particles within an electrode structure before the application of an electric field and after the application of an electric field, respectively.
Figure 11B:
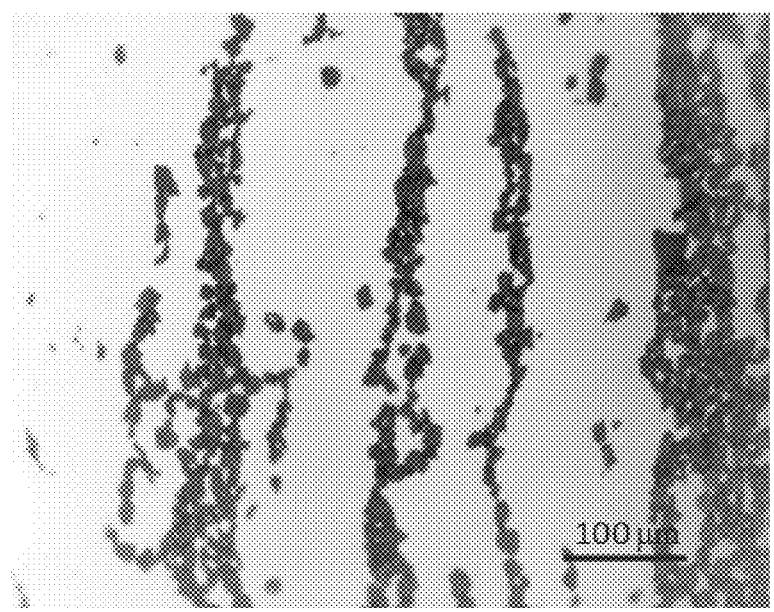

An example of this chaining effect of dipolar particles within a cathode material of an electrode structure is shown in FIGS. 11A and 11B, with the dark dots being particles and the white area being empty space or voids. FIG. 11A is an image taken with a stereo microscope and shows a slurry of LMO particles in an electrode structure before the application of an electric field. As shown in FIG. 11A, the LMO particles are randomly distributed. FIG. 11B is an image of the LMO particles of FIG. 11A after the application of an electric field. As shown in FIG. 11B, the LMO particles are rearranged and organized to form several chains that are generally parallel with one another and with the direction of the applied electric field. In this example, the electric field was applied in a direction that extends from the bottom of the image of FIG. 11B toward the top of the image. The Brunauer-Emmett-Teller (BET) test was used to determine the relative difference in surfaces areas between FIGS. 11A and 11B. The surface area of the electrode structure after the application of the electric field (FIG. 11B) was found to be about twice that of the electrode structure before the application of the electric field (FIG. 11A), with measured surface areas of 3.5 $m^2/g$ and 1.7 $m^2/g$, respectively.

Figure 2A:
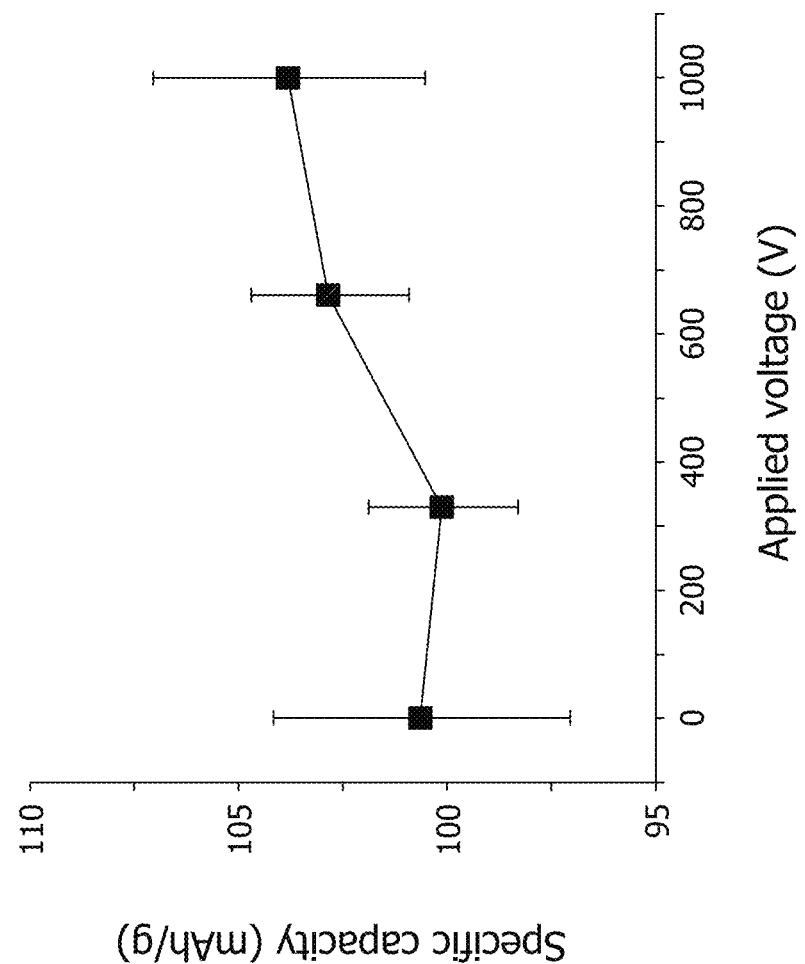
FIGS. 2A and 2B illustrate average specific capacity and cycling performance, respectively, of different configurations of electrode structures manufactured using the tape casting system of FIG. 1.
Figure 2B:
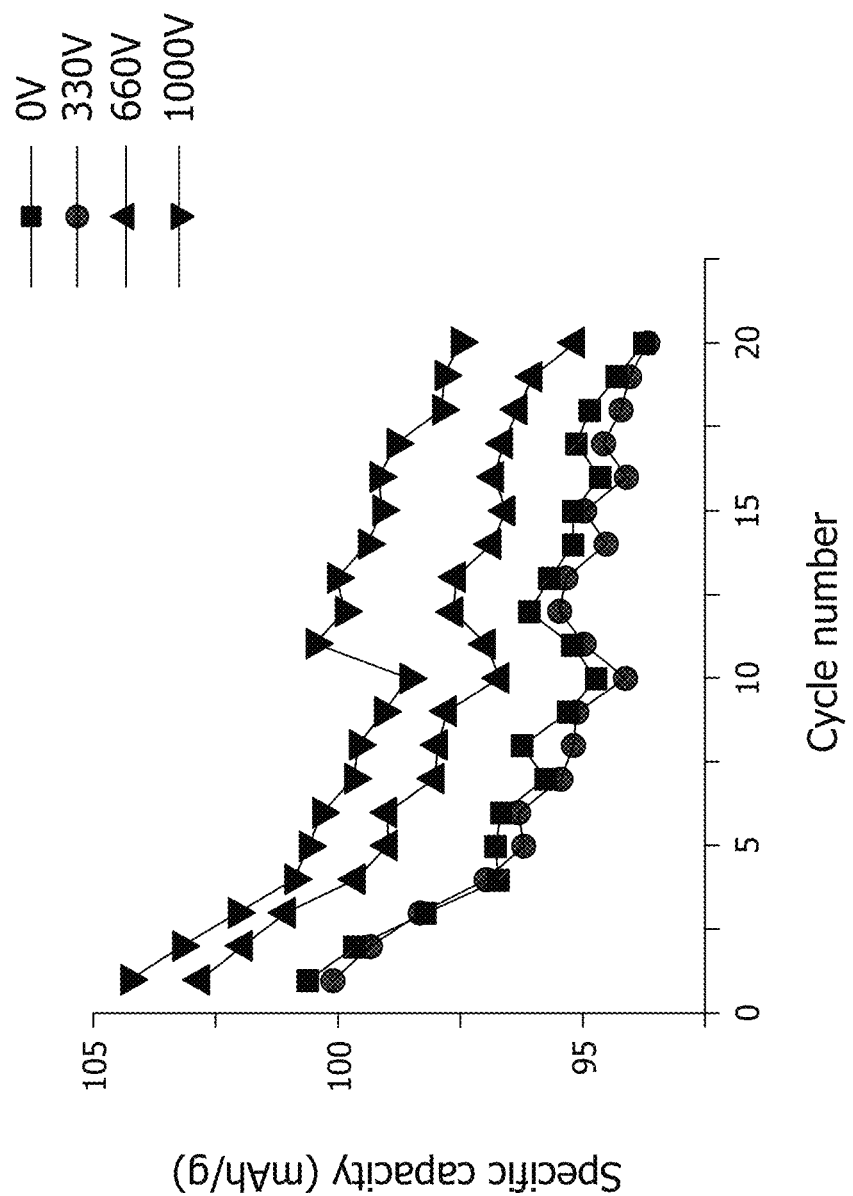
Figure 3:
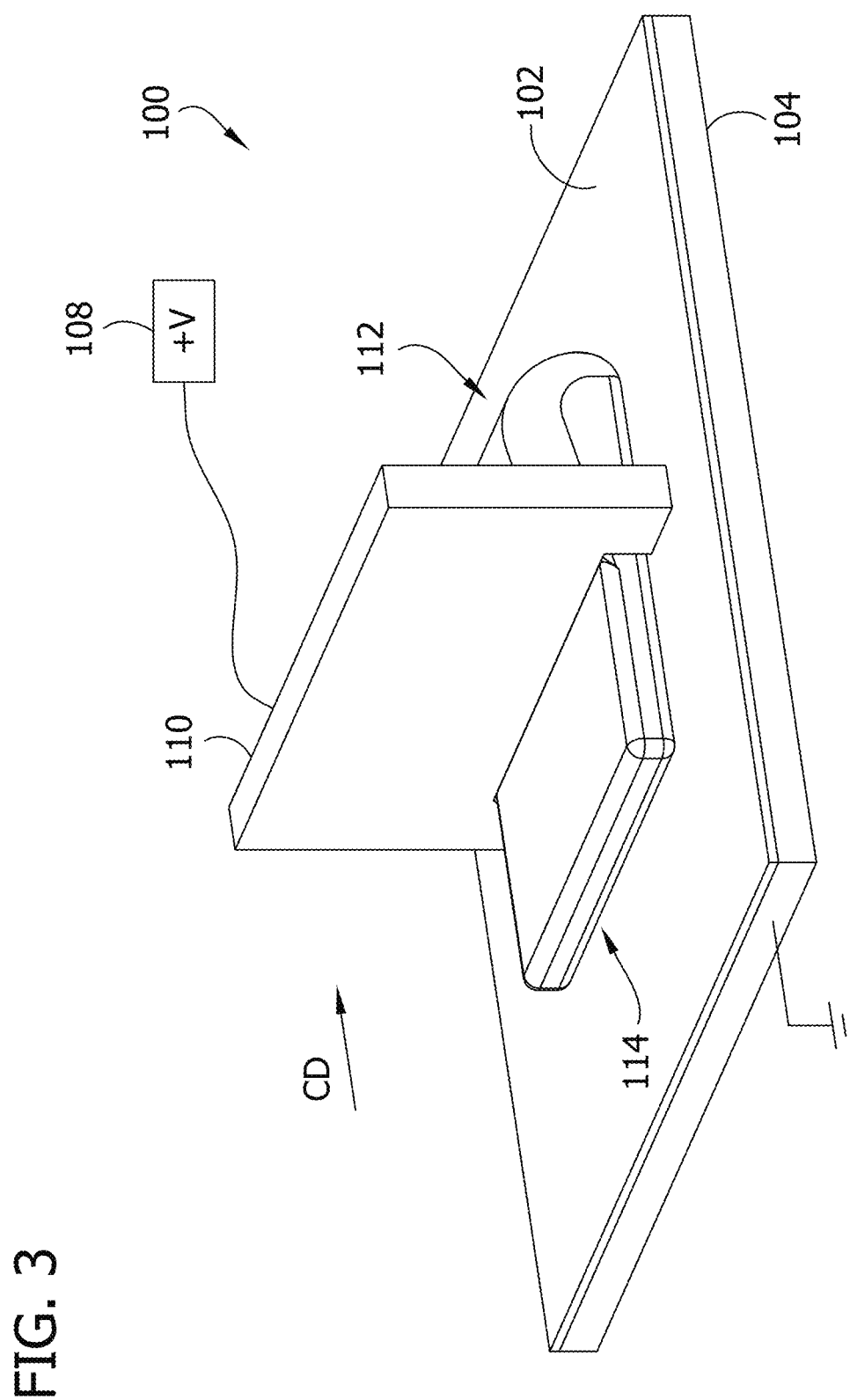
FIG. 3 is a perspective of the tape casting system of FIG. 1.

Referring to FIGS. 1-3, one embodiment of a tape casting system 100 for manufacturing an electrode structure 114 (e.g., a three-dimensional (3-D) electrode structure) is generally indicated by reference numeral 100. The tape casting system 100 includes an electrically conductive foil piece 102 fixed on an electrically conductive substrate 104. Any suitable conductive foil such as aluminum foil, copper foil, stainless steel foil, etc. may be used. The substrate 104 is grounded and acts as a current collector. The substrate 104 may be formed from any suitable electrically conductive material. The tape casting system 100 includes a doctor blade 110 connected to a power supply 108 to apply the voltage, which generates an electrical field, during tape casting. In this manner, the electric field is generated through a paste 112 as it is cast (e.g., shaped) via the doctor blade 110 onto the aluminum foil 102. The paste 112 is a generally viscous cathode material that contains the dipolar particles and solidifies (e.g., cures) into the electrode structure 114. During the casting process, the doctor blade 112 moves in the casting direction CD through paste 112 supported by (e.g., on) the aluminum foil piece 102 to form (e.g., cast) the paste into the electrode structure 114.

In an example, a $LiMn_2O_4$ (LMO) powder is the cathode material of the paste 112 used to fabricate the electrode structure 114. The paste 112 for tape casting is prepared by first mixing LMO powder (13 μm) with carbon black and Polyvinylidene fluoride. In this example, the mixture is then dispersed in an N-Methyl-2-pyrrolidone solvent to prepare a uniform paste. It is understood the tape casting system 100 of the present disclosure can be used to cast pastes comprised of other cathode/anode materials.

As shown in FIGS. 1 and 3, the aluminum foil piece 102 is fixed on the substrate 104 as a current collector. The substrate 104 is grounded. The power supply 108 is electrically connected to the doctor blade 110 to apply the voltage thus generating an electric field through the paste 112 during tape casting. As the doctor blade 110 moves through the paste 112 in the casting direction CD, the power supply 108 simultaneously supplies the voltage to the doctor blade. This generates an electric field between the doctor blade 110 and the substrate 104 and through the paste 112 to arrange the dipolar particles in the paste into chains, as described above, while the electrode structure 114 is being formed. In an embodiment, the LMO paste 112 is cast via the doctor blade 110 onto the aluminum foil 102, with maximum 1 kV applied voltage and 50 μm thickness with the doctor blade moving at approximately 5 mm/s (0.2 in/s). In one embodiment, after deposition, the electrode structure 114 may be dried under vacuum at about 120° C. (248° F.) overnight.

Figure 4B:
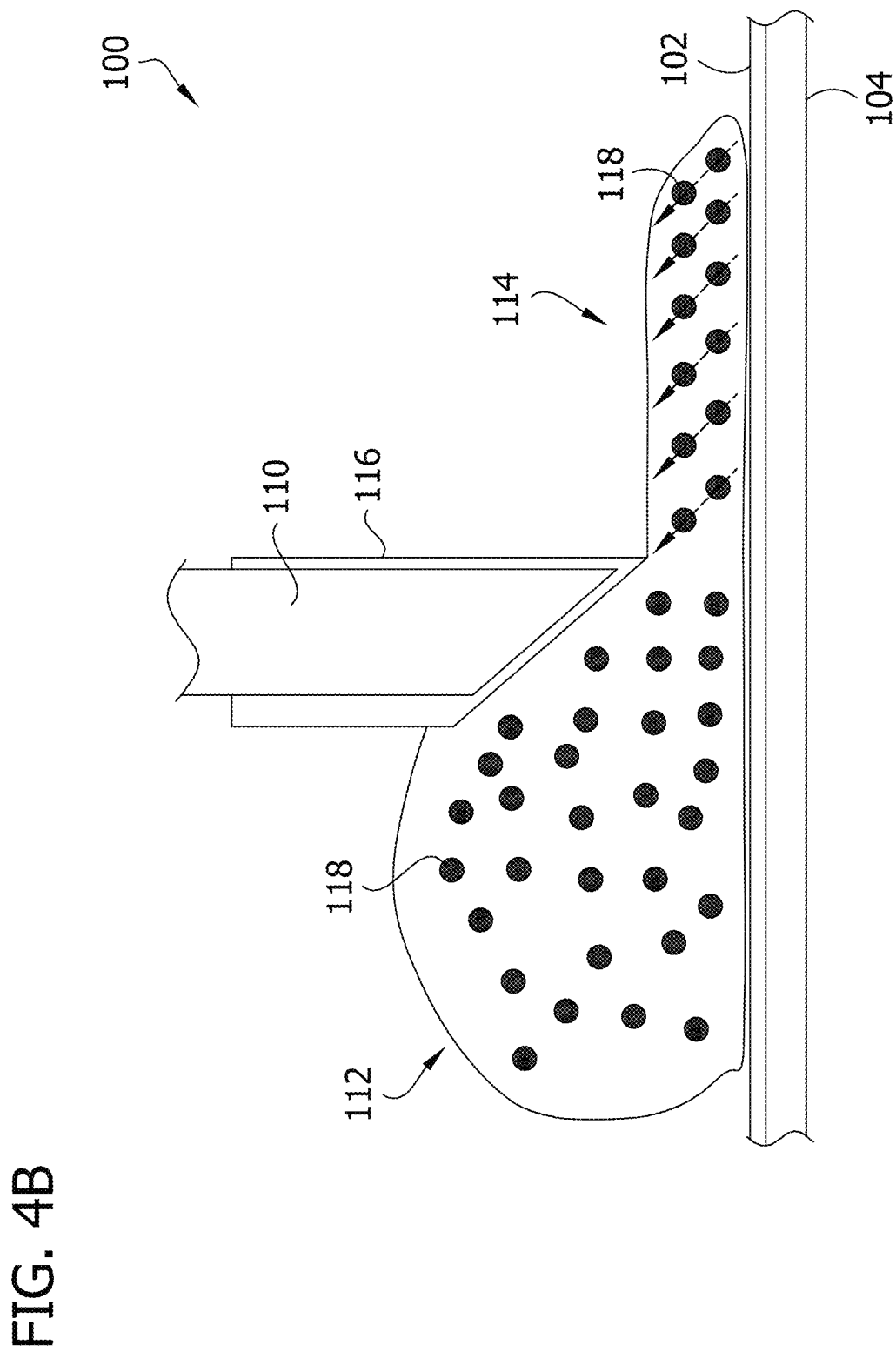
FIG. 4B is an enlarged cross-section of the tape casting system of FIG. 4A, the tape casting system manufacturing an electrode structure with the application of an electric field.

Referring to FIGS. 4A and 4B, in one embodiment, the doctor blade 110 of the tape casting system 100 may have a coating 116 thereon covering the doctor blade. The coating 116 is electrically insulating and prevents a short circuit between the doctor blade 110 and the substrate 104. For example, the coating 116 may be Kapton tape, although any suitable electrically insulating coating is within the scope of the present disclosure. FIGS. 4A and 4B, also illustrate the effect of applying a voltage to the doctor blade 110 to generate the electric field through the paste 112 has on the dipolar particles, schematically illustrated by dots 118, during the casting process. FIG. 4A illustrates the use of the tape casting system 100 to form the paste 112 into an electrode structure 114 without applying a voltage to the doctor blade 110. As shown in FIG. 4A, the dipolar particles 118 maintain their random distribution in the electrode structure 114. FIG.

4B illustrates the use of the tape casting system 100 to form the paste 112 into an electrode structure 114 with the application of a voltage by the power supply 108 to the doctor blade 110 to generate an electric field through the paste. As shown in FIG. 4B, the dipolar particles 118, under the force of the electric field, arrange and organize themselves into a series of parallel chains within the electrode structure 114. The dipolar particle chains are also parallel with the direction of the electric field.

For test purposes, an electrode structure 114 produced by tape casting system 100 is used in a button or coin cell battery 500 (e.g., CR2032) (see FIG. 10) housed in an argon-filled glove box. LMO is used as a cathode material, Li foil is used as an anode 502, and a commercially available PP/PE/PP membrane is used as a separator 504. The battery is filled with 1M LiFP$_6$ EC:DMC 1:1 as the liquid electrolyte 506. As generally known in the art, the button cell battery 500 also includes a cap 508, spring 510, spacer disk 512, gasket 514, case 516, and aluminum foil 518. FIGS. 2A and 2B illustrate the average specific capacity and cycling performance, respectively, of electrode structures 114 produced by tape casting system 100 with different voltages being applied to the doctor blade 110 for each electrode structure. Four electrode structures 114 were fabricated under different applied voltages (0V, 330V, 660V, and 1000V) using 8:1:1 LMO paste (30% solids loading), and the battery was tested at 0.1C. FIG. 2A shows the average specific capacity of the four electrode structures (e.g., cells) for each case. The average specific capacity increase 3.1% with increasing applied voltage from 0V to 1 kV, as shown in FIG. 2A. The cycling performance, as shown in FIG. 2B, indicates that the electrode with 660V and 1 kV are able to improve by 3.1% specific capacity compared to the electrode with 0V and 330V when the capacity is stabilized. Thus, the performance of the electrode structure was enhanced with the application of the electric field.

Figure 5A:
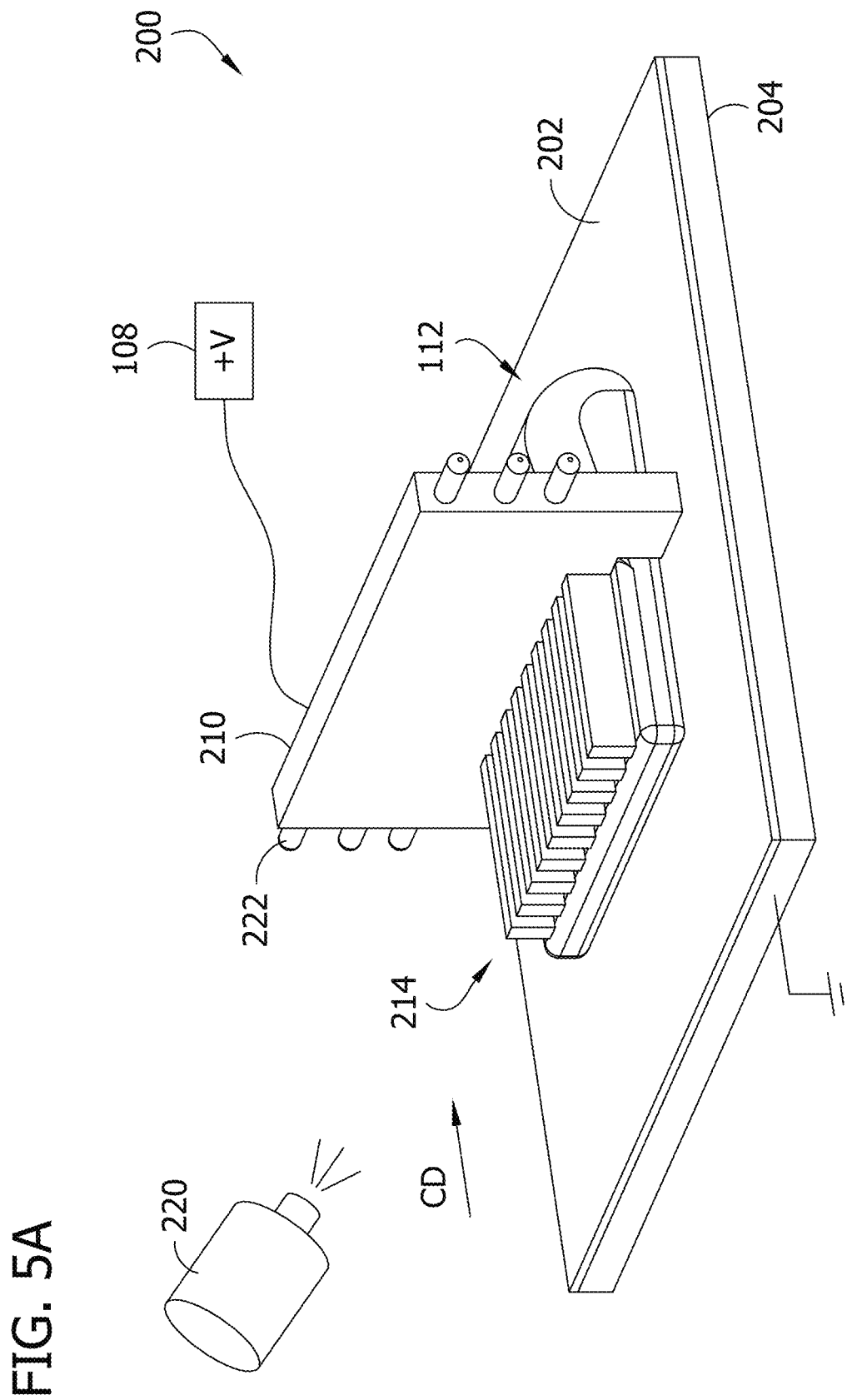
FIG. 5A is a perspective of a tape casting system according to another embodiment of the present disclosure.
Figure 5B:
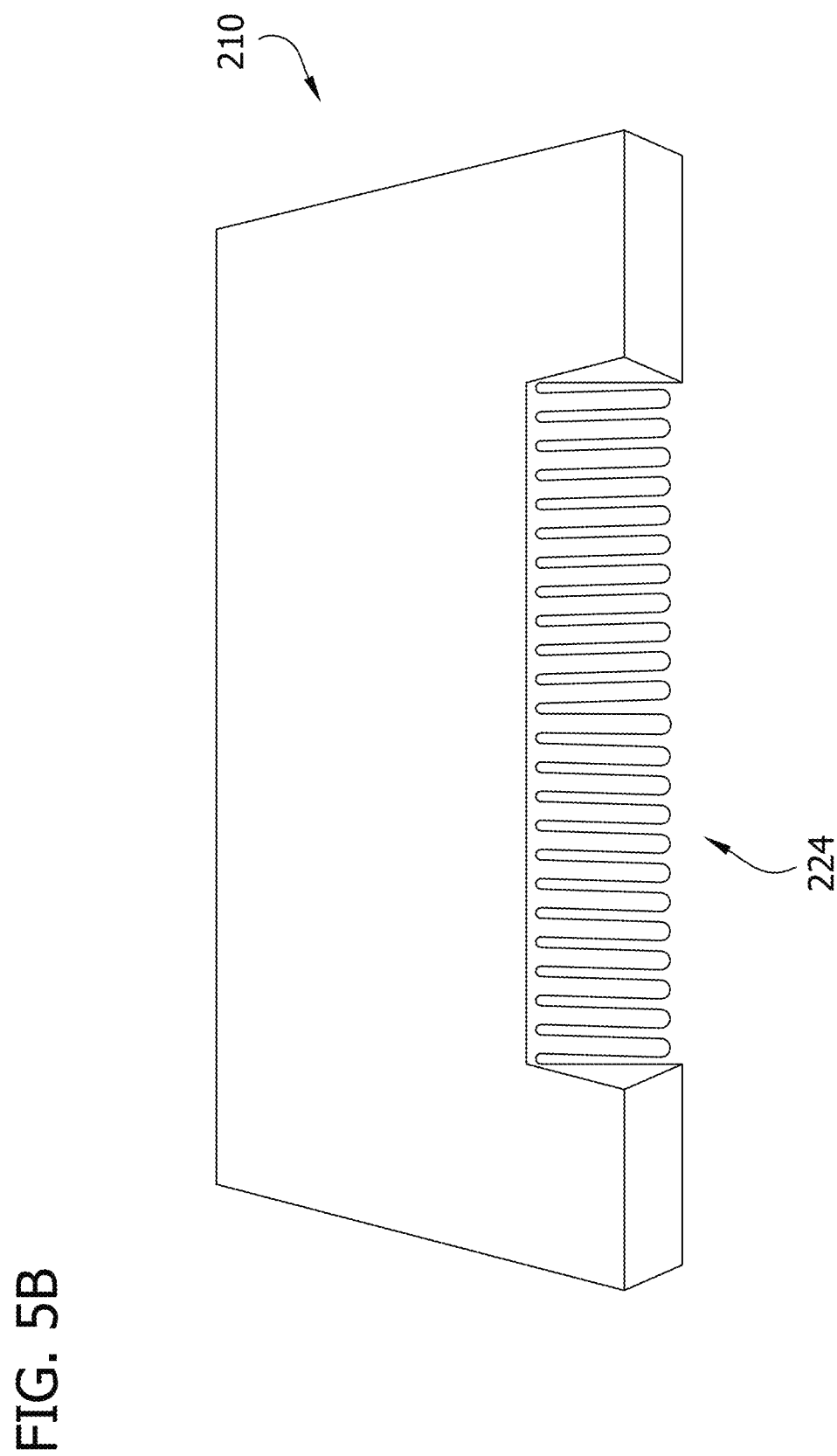
FIG. 5B is a front perspective of a doctor blade of the tape casting system of FIG. 5B.

Referring to FIGS. 5A and 5B, another embodiment of a tape casting system for manufacturing an electrode structure 214 is generally indicated by reference numeral 200. Tape casting system 200 is analogous to tape casting system 100, thus, for ease of comprehension, where analogous parts are used, reference numerals "100" units higher are employed. In this embodiment, the tape casting system 200 includes one or more heat sources (e.g., heating elements), configured to heat the electrode structure 214 produced by the tape casting system 200. The heating sources may heat the electrode structure 214 directly or heat the electrode structure indirectly by heating another component of the tape casting system 200 (e.g., doctor blade 210, substrate 204, etc.). Heating the electrode structure 214 significantly reduces the time required for the paste 112 to solidify (e.g., the paste 114 is viscous and needs to dry in order to solidify and maintain a 3-D shape). By reducing the drying time of the paste 112, the macrostructure (e.g., 3-D shape) of the electrode structure 214 imparted by the doctor blade 210 is able to be better maintained. In other words, heating the electrode structure 214 after it has been shaped by the doctor blade 210 significantly reduces the drying time of the paste 112, which minimizes the likelihood the electrode structure will collapse or otherwise deform during extended drying times. Reducing the amount of time it takes for the paste 112 to solidify also helps maintain the arrangement of the dipolar particles formed by the electric field by preventing the movement of the dipolar particles in the cathode material due to brown motion (e.g., the random movement of particles in a viscous substance). The temperature the electrode structure 214 is heated to by the heating sources depends on the type of solvent used to make the paste 112. For example, a paste 112 made with N-Methyl-2-pyrrolidone as the solvent is heated to about 120° C. (248° F.) to accelerate the solidification of the electrode. Likewise, a paste 112 made with water as the solvent is heated to about 50° C. (122° F.). In one exemplary test, heating the electrode structure 214 resulted in the paste 112, with N-Methyl-2-pyrrolidone as the solvent, being partially dried and solidified within 1 minute and fully dried within 10 minutes, as opposed to taking 6 to 10 hours to fully dry in ambient air.

Referring to FIG. 5A, the heating source may be any one of a hot plate (not shown), a laser 220, or one or more heating coils 222. The tape casting system 200 may include one or more of these heating sources and may use these heating sources simultaneously or individually. For example, the illustrated tape casting system 200 includes both a laser 220 and heating coils 222. The hot plate is in contact with the substrate 204 to heat the substrate and thereby the electrode structure 214. The laser 220 is disposed above the substrate 204 and is configured to follow the doctor blade 214 to heat the electrode structure 214 after the doctor blade as shaped the paste 112. The one or more heating coils 222 are embedded within the doctor blade 210 and heat the doctor blade so that the doctor blade heats the electrode structure 214 as the doctor blade is forming the paste 112 into the electrode structure. In the illustrated embodiment, three heating coils 222 are used, although other configurations are within the scope of the present disclosure. In one embodiment, the heating coils 222 are electrically resistive heating coils. The heating sources may be used simultaneously with the formation of the electrode structure 214 by the doctor blade 210 or after (e.g., immediately after) the formation of the electrode structure by the doctor blade to rapidly dry the paste 112 and solidify the electrode structure.

In addition to the heating sources, the tape casting system 200 has a doctor blade 210 with a different configuration than doctor blade 110. In particular, doctor blade 210 has a different shaped opening than doctor blade 110, which results in doctor blade 210 imparting a different 3-D shape to electrode structure 214. The shape of the opening in the doctor blade 110, 210 corresponds to the 3-D cross-sectional shape of the electrode structure 114, 214. Doctor blade 110 defines an unobstructed rectangular opening, which results in the doctor blade producing an electrode structure 114 with a rectangular cross-sectional shape (see FIG. 3). In contrast, doctor blade 210 defines a rectangular opening with a plurality of teeth 224 configured to impart a surface pattern onto the electrode structure 214. The teeth 224 have a rectangular cross-section and extend into the opening of the doctor blade 210. As a result, doctor blade 210 forms an electrode structure 214 having a base with a plurality of parallel ribs extending upward from the base along the length of the electrode structure (see FIG. 5A). Doctor blades having other configurations and able to form electrode structures of other shapes are within the scope of the present disclosure.

In one embodiment, tape casting system 200 may include a vibrator (not shown) configured to vibrate the electrode structure 214 during the tape casting process. The vibrator is operatively connected to the substrate 204 to vibrate the substrate and the electrode structure 214 formed thereon. Vibrating the electrode structure 214 enhances the movement of the dipolar particles within the cathode material (due to the Brazil nut effect and/or reverse Brazil nut effect) to facilitate the arrangement and organization of the dipolar particles within the cathode material. Preferably, the vibrator vibrates simultaneously with the movement of the doctor blade 210 in order to facilitate the movement of the dipolar particles into the one or more chains within the cathode material of the paste 112. In other embodiments, the vibrator may vibrate before and/or after the movement of the doctor blade 210. In one embodiment, the vibrator vibrates the electrode structure 214 in a horizontal plane that is generally perpendicular to the direction of the electric field.

Referring to FIGS. 6A-6F, one embodiment of a micro-slurry casting process for arranging dipolar particles within an electrode structure is generally indicated at reference numeral 300. The micro-slurry casting process 300 is able to produce an electrode structure 114, 214 formed from a paste 112 having a low solids loading (e.g., the volumetric ratio of solids in a solution) of dipolar particles that has the performance characteristics of an electrode structure formed from a paste having a higher solids loading of dipolar particles. Low solids loading pastes are less viscous then higher solids loading pastes. It is easier for the dipolar particles to move and be arranged into chains when subject to an electric field in low solids loading pastes than higher solids loading pastes. Accordingly, the application of the electric field has a greater impact and is better able to form dipolar particle chains in pastes having low solids loading (such as 10% solids loading of LMO particles) than high solids loading (such as 30% solids loading of LMO particles). However, generally, electrode structures formed from pastes having higher solids loading (30% solids loading) provide enhanced performance characteristics (e.g., specific capacity) over electrodes formed from pastes having lower solids loading (10% solids loading). The micro-slurry casting process 300 can produce electrode structures from low solids loading pastes that have the performance characteristics of electrodes formed from high solids loading pastes while also maximizing the impact the electric field has on the electrode structure, to further improve the electrode structures performance characteristics.

Referring to FIG. 6A, a low solids loading paste 302, such as a paste having 10% solids loading, for forming the electrode structure is prepared. The use of other low solids loading pastes, such as pastes having equal to or less than 20% solids loading, are within the scope of the present disclosure. Next, in FIG. 6B, a first electric field is applied to the paste 302 to arrange the dipolar particles, as described above. Vibration may also be simultaneously applied with the electric field to facilitate the movement of the dipolar particles. Next, in FIG. 6C, the paste 302 is tape casted into an electrode structure 304. In this embodiment, the micro-slurry casting process 300 utilizes tape casting system 200, as described above, to form the electrode structure 304, although any of the tape casting systems disclosed herein may be used. Tape casting system 200 applies a second electric field, as described above, in addition to the first electric field to further arrange the dipolar particles into chains. In FIG. 6D, the electrode structure 304 is placed in the chamber 308 of a vessel 306, such as an iso-pressing machine. The vessel 306 is filled with a generally uncompressible fluid, such as oil, and then a piston moves into the chamber 308, compressing the electrode structure, via the fluid, to increase the density of the electrode structure. The electrode structure 304 is placed within a container (not shown), such as a plastic bag, within the vessel 306 to prevent the uncompressible fluid from contacting the electrode structure. In FIG. 6E, a sprayer 312 sprays a separator onto the electrode structure 304, coating the electrode structure. FIG. 6F shows the electrode structure 304 as a cathode attached to a current collector 314 and assembled with an anode.

Referring now to FIGS. 7A-9, compared to other nano-manufacturing methods (e.g., lithography tools), which are expensive and time-consuming, additive manufacturing (e.g., 3-D printing) has several advantages because it can provide an inexpensive and flexible manufacturing process that includes more complex geometry designs and a wider selection of materials.

Preparation of the proper composition of paste for additive manufacturing is demanding because of several requirements, including the need to prevent clogging of the nozzles while promoting a bond between each filament and keeping the controlled feature geometry after deposition. As is known in the art, these requirements limit the fabrication resolution. In order to have a finer fabrication resolution, the cost and required time for fabrication and material preparation via additive manufacturing is considerably increased. And as explained above, the use of paste chemical components for LIB applications is a critical factor in battery performance because the presence of excessive binders in the paste can decrease ionic and electronic conductivity. Advantageously, applying an electric field after paste deposition during additive manufacturing can be used to further manipulate the battery microstructure on a particle microstructure level to achieve improved battery performance. The hybrid fabrication method is able to fabricate macro-micro controlled structures simultaneously without complicated preparation or post-processing.

Figure 7A:
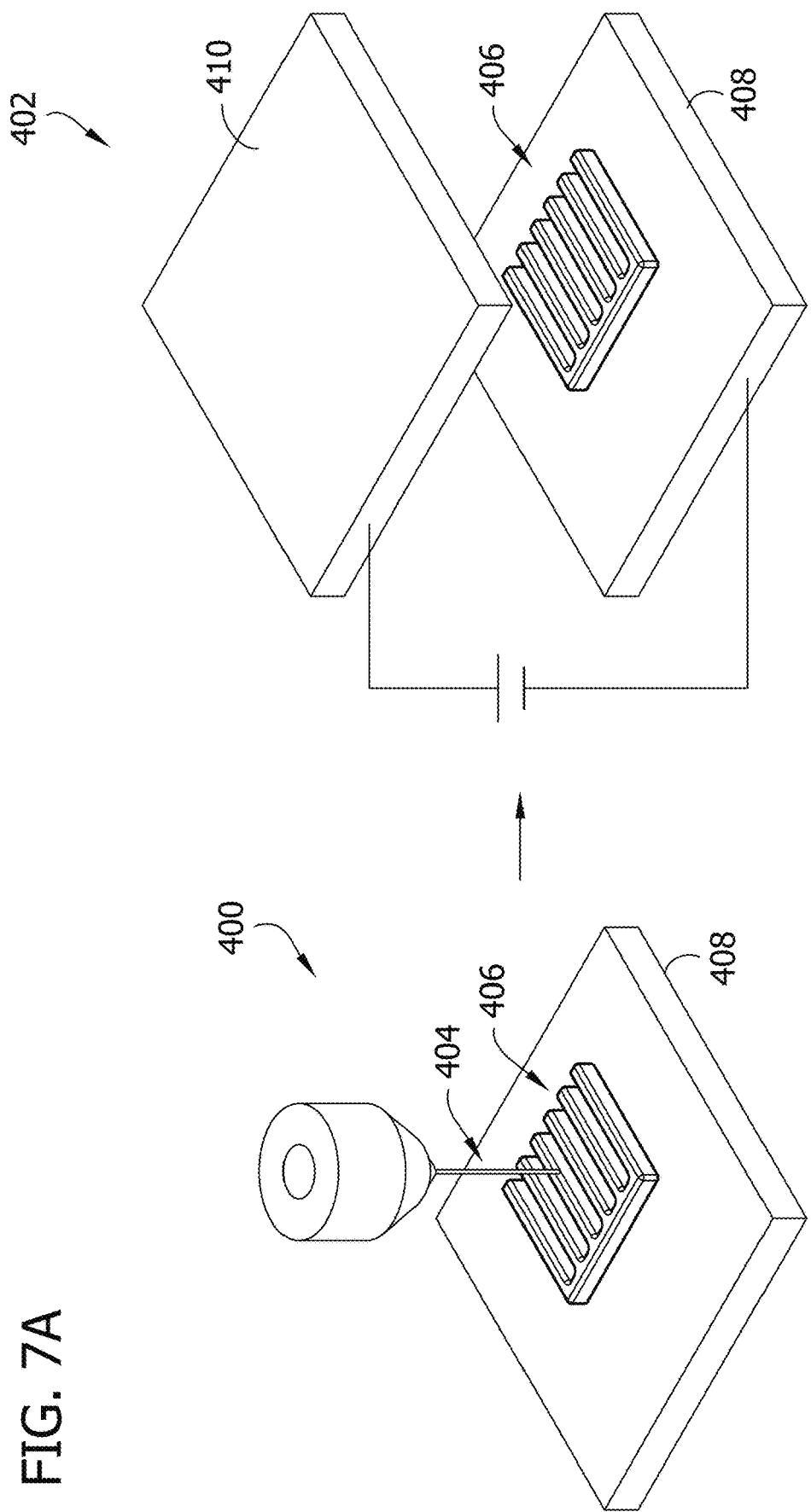
FIG. 7A illustrates an additive manufacturing system and electric field treatment system for producing macro/micro controlled electrode structures according to one embodiment of the present disclosure.
Figure 8:
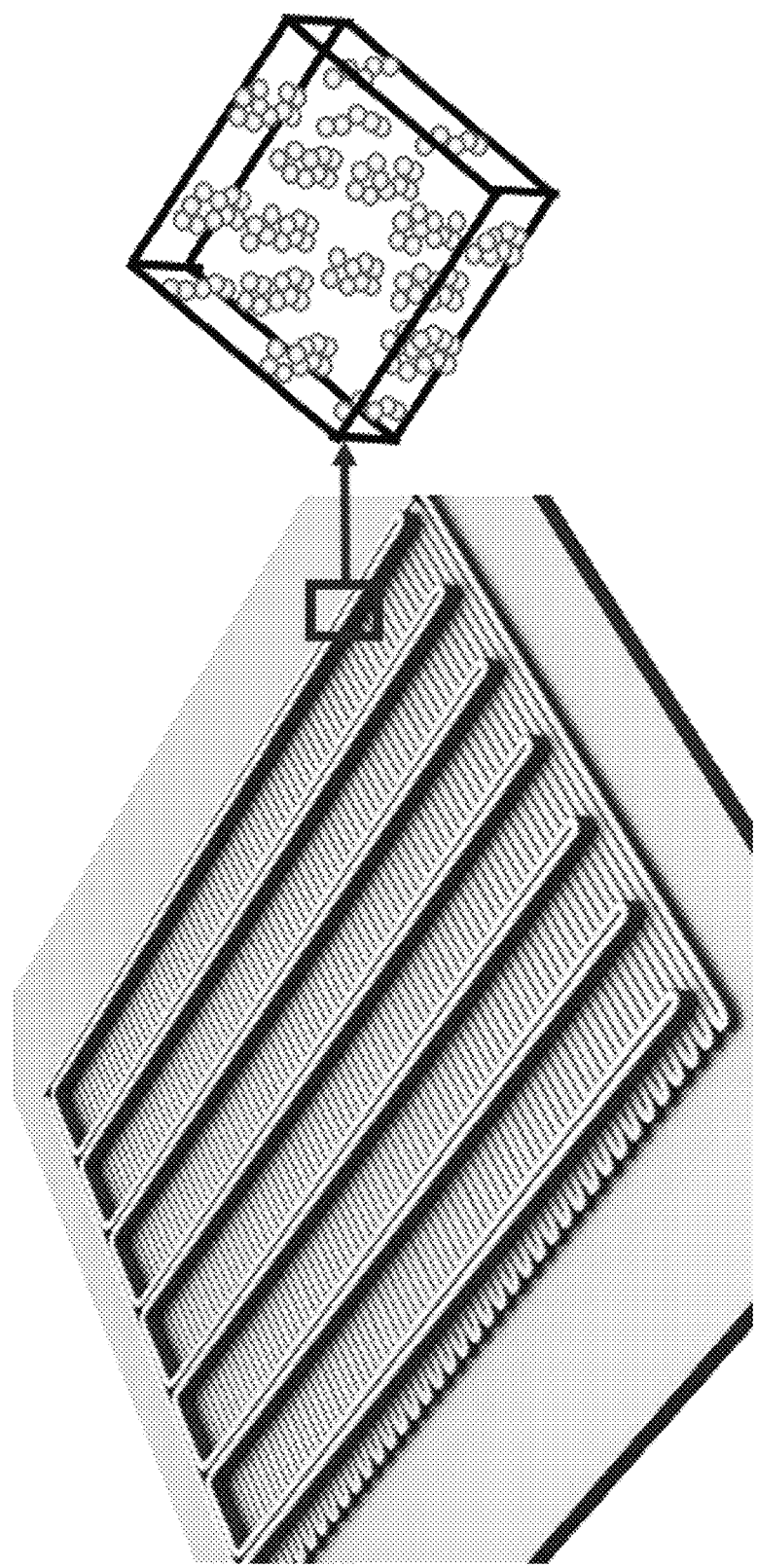
FIG. 8 illustrates micro/macro controlled electrode structures manufactured using the processes of FIG. 7.

FIG. 7A illustrates an additive manufacturing system 400 including an electric field treatment system, indicated generally at 402. A method embodying aspects of the invention combines an additive manufacturing process followed by an electric field treatment. As shown in FIG. 7A, an exemplary extrusion-based additive manufacturing system deposits a paste 404 into an electrode structure 406 (e.g., a 3-D electrode structure). An aluminum foil piece was fixed on a substrate 408 prior to printing to serve as a bottom current collector. In an embodiment, the additive manufacturing system 400 (and as shown in FIG. 4A) comprises a motion subsystem, extrusion devices, and a power supply for the electric field. The paste 404 is loaded into a 10 ml plastic syringe with a 150 μm nozzle, and extruded with 80 psi extrusion pressure onto the substrate as the substrate 408 moves in the XY-plane. As shown in FIGS. 7A and 8, to form the electrode structure 406, first, a base layer is printed to cover the bottom current collector as a conventional laminated structure. Next, a digital structure is printed on the top of the base layer to increase the specific surface area. After deposition, an electric field is applied to the electrode structure 406 by the electric field treatment system 402 to arrange the dipolar particles into one or more chains (e.g., microstructure), as described above. In an embodiment, opposite conductive surfaces spaced apart at a distance of 1.25 cm and operating at a voltage of 10 kV generate the desired electric field to obtain micro controlled structure, as described above. The amount of time the electric field is applied to the electrode structure 406 depends upon the solid loading percentage and the materials used to form the paste 404. In one embodiment, the electric field is applied continuously until the paste 404 is solidified. In the illustrated embodiment, the conductive surfaces includes the substrate 408 which supports the electrode structure 406 and an upper conductive surface 410 disposed above and spaced apart from the substrate.

In one embodiment, the additive manufacturing system 400 includes one or more of the heating sources (e.g., hot plate and laser), described above, configured to heat the electrode structure 406 to significantly reduce drying time and maintain the 3-D shape (e.g., macrostructure) of the electrode structure formed by the additive manufacturing system. The one or more heating sources may heat to the electrode structure 406 to reduce drying time before, after and/or simultaneously with the application of the electric field. In one embodiment, the heating sources may heat the electrode structure 406 to reduce drying time simultaneously with the printing process of the electrode structure. In a further embodiment, the electric field may be applied for three hours and, simultaneously therewith, the one or more heating sources, such as the hot plate, heats the electrode structure 406 to 120° C. (248° F.) to remove solutions and quickly dry the electrode structure.

Figure 7B:
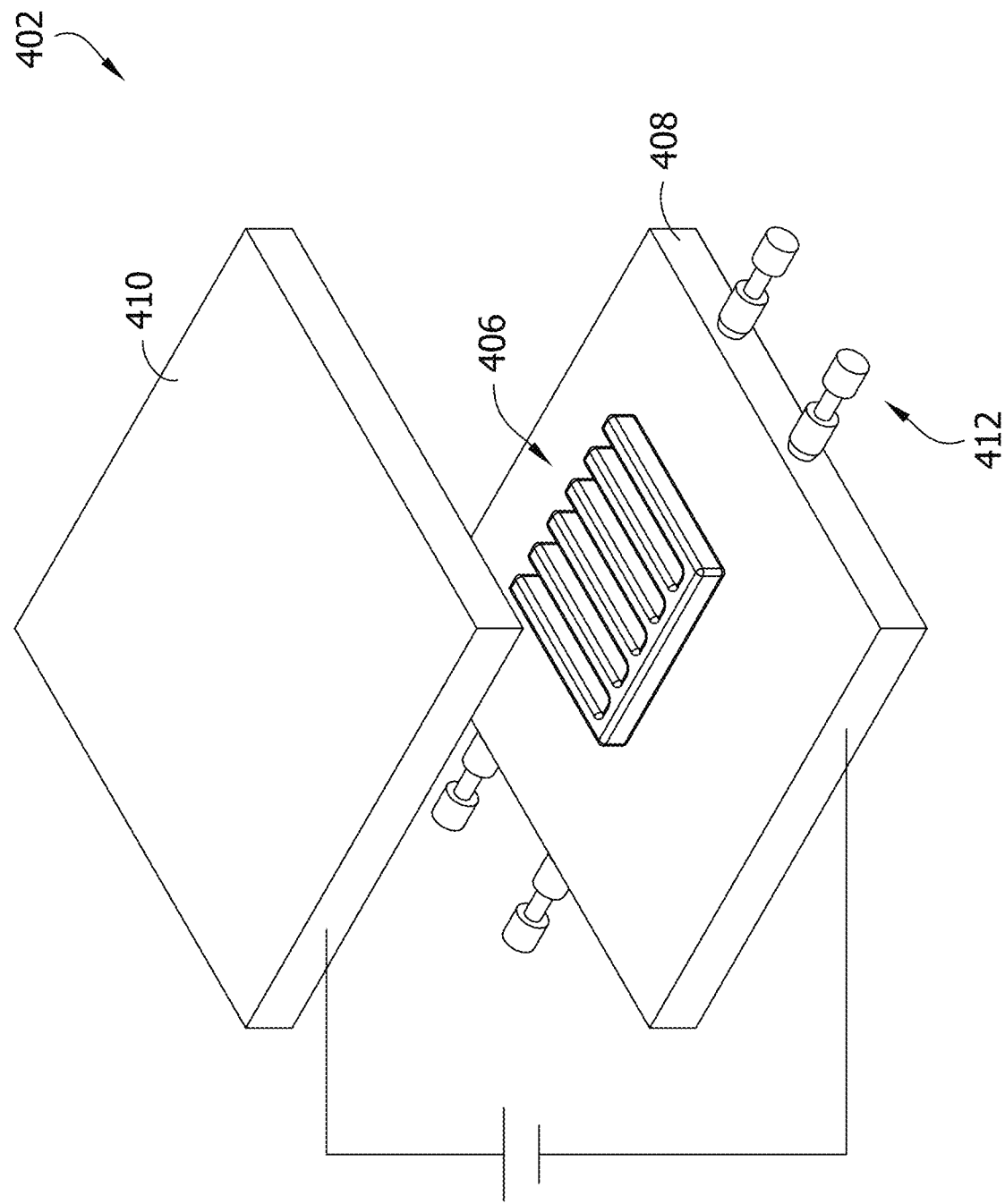
FIG. 7B illustrates another embodiment of the electric field treatment system for the additive manufacturing system of FIG. 7A.

As shown in FIG. 7B, in one embodiment the electric field treatment system 402 includes a vibrator 412 operatively connected to the substrate 408 and configured to vibrate the electrode structure 406 to facilitate the movement of the dipolar particles, as described above. In one embodiment, the vibrator 412 may vibrate the electrode structure 406 after the printing process is complete. In one embodiment, the vibrator 412 may vibrate the electrode structure 406 before, after and/or simultaneously with the application of the electric field. Preferably, the vibrator 412 vibrates the electrode structure 406 in a horizontal plane, which is generally perpendicular to the direction of the electric field (vertically between the conductive surfaces 408, 410). Vibrator 412 may be used as the vibrator for the tape casting system 200, described above. The use of other vibrators to vibrate electrode structures 114, 214, 302, 406 are within the scope of the present disclosure.

In one embodiment, the electric field treatment system 402 applies the electric field to the electrode structure 406 under freezing temperatures. The freezing temperature applied depends on the type of solution (e.g., solvent) used to make the paste. For example, a paste made with water as the solvent is placed under a temperature between the inclusive range of 0° C. to −40° C. (32° F. to −40° F.). However, an organic solvent will require a lower applied temperature, as low as −80° C. (−112° F.). Under freezing conditions, the electrode structure 406 will solidify because any liquid in the paste 404 will crystalize. As a result, a unique structure based on the electric field and ice-crystal growth is formed within the electrode structure. The dipolar particles arrange into chains, as described above, under the application of the electric field. In addition, dipolar particles of the electrode structure 406 forms an ordered porosity due to ice-crystal growth as the paste 404 freezes that is generally perpendicular to the direction of the applied electric field. In this manner, a unique structure with ordered dipolar particles in two directions is obtained, to further enhance the performance characteristics of the electrode structure 406. After the electrode structure 406 freezes, a freeze drying process is performed to remove the frozen liquid from the electrode structure. The freeze drying process sublimates the solvent, such as water, and causes no volume changes to retain the particle and vice-crystal voids to be retained by the electrode.

Similar to the example described above, a $LiMn_2O_4$ (LMO) powder is used to fabricate the electrode structure 406. The paste 404 for deposition is prepared by first mixing LMO powder (13 μm) with carbon black and Polyvinylidene fluoride. In this example, the mixture is then dispersed in an N-Methyl-2-pyrrolidone solvent to prepare a uniform paste.

Figure 9:
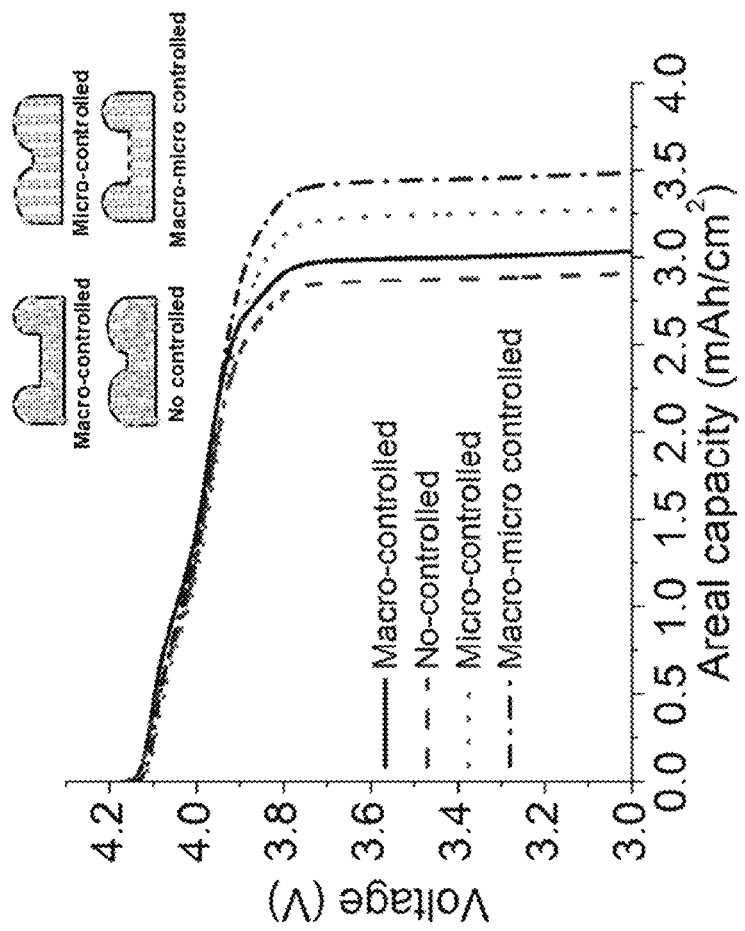
FIG. 9 illustrates areal capacity for different configurations of micro and/or macro controlled electrode structures manufactured using the processes of FIG. 7.
Figure 10:
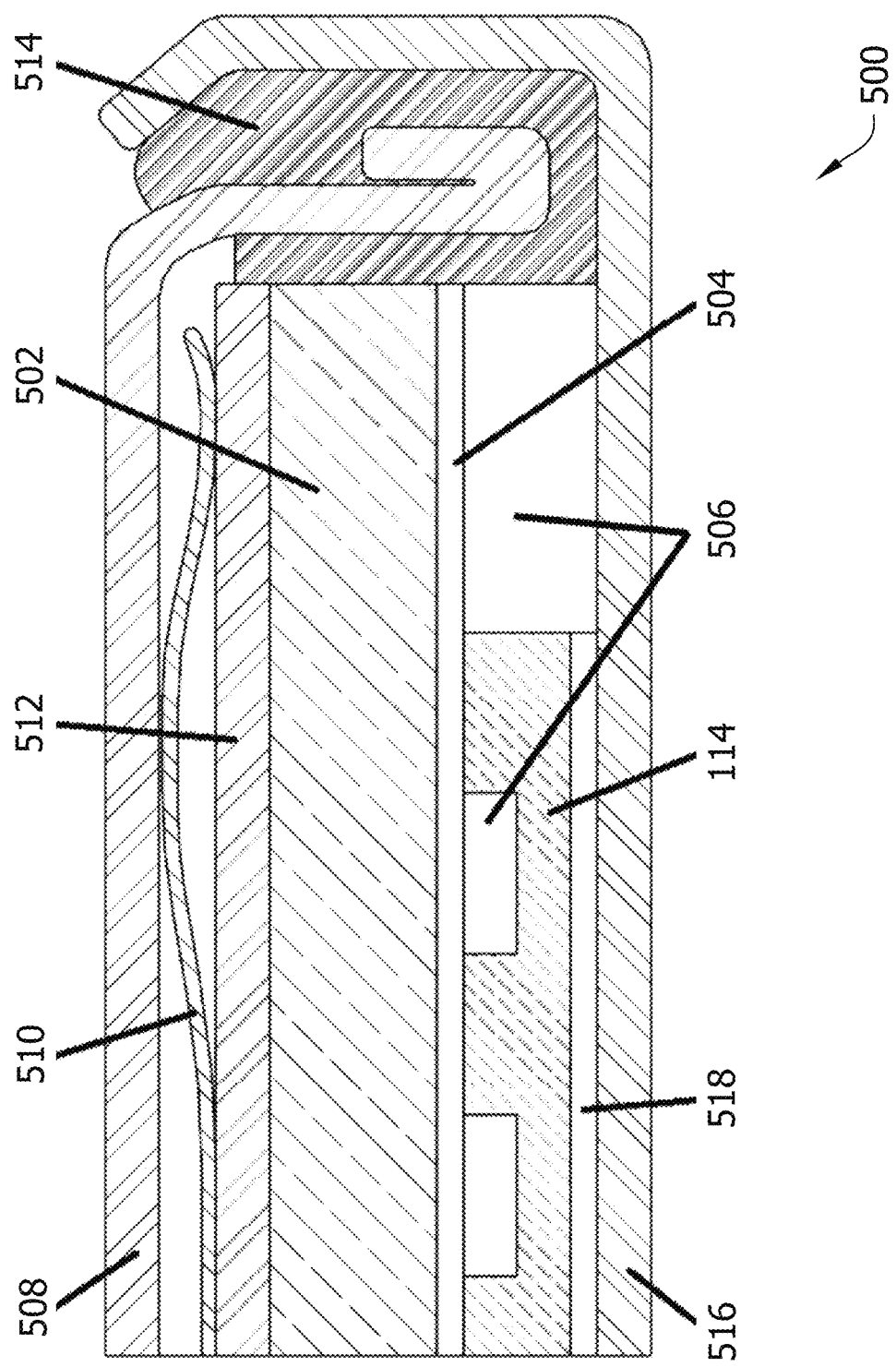
FIG. 10 is a partial cross-section of a coin cell assembly for use with the electrode structures manufactured according to the teachings of the present disclosure.

FIG. 9 illustrates the areal capacity for different configurations of electrode structures 406 constructed according to the teachings of the present disclosure using additive manufacturing. The four different configurations of the 3-D printed electrode structures 406 that were compared include: (1) No controlled structure (e.g., an electrode structure constructed without use of a heating source or applying an electric field); (2) Macro-controlled structure (e.g., using a heating source but not applying an electric field); (3) Micro-controlled structure (e.g., applying an electric field but not using a heating source); and (4) Macro-micro controlled structure (e.g., using a heating source and applying an electric field). The different electrode structures 406 were tested using the coin cell battery 500, as shown in FIG. 10 and described above, with the electrode structures used as the cathode. As described above, the process using the heating source improves the external 3-D structure morphology (e.g., shape), while the application of the electric field increases the dipolar particle order inside the electrode structure. During testing, the electrode structure constructed with the use of a hot plate as the heating source provided 30% more surface area than an electrode structure constructed without use of the hot plate, by preventing the 3-D shape from deforming. Similarly, the applied electric field doubled the specific surface area of the electrode. The areal capacity was 2.8 mAh/cm2 for the electrode structure 406 with no controlled structure. However, the areal capacity increased for the electrode structure 406 with macro-controlled structure to 3.1 mAh/cm2 and also increased for the electrode structure with micro-controlled structure to 3.3 mAh/cm2. This difference in the respective increase of the areal capacities indicates that micro-control (e.g., electric field) has more of an impact than macro-control (e.g., heating source). Finally, the electrode structure 406 with macro-micro controlled structure showed the best performance (3.5 mAh/cm2) by simultaneously utilizing the advantages of a 3-D structure and electronically ordered particles. Further details regarding the additive manufacturing process 400 may be found in the paper entitled: Macro-/Micro-Controlled 3D Lithium-Ion Batteries via Additive Manufacturing and Electric Field Processing, which was published in Scientific Reports (citation: Scientific Reports 8, Article Number: 1846 (2018)) and the entirety of which is hereby incorporated by reference.

As described above, in an embodiment, a conductive substrate is required during the electric field treatment. It is to be understood that this might limit the thickness of the battery electrode. In another embodiment, the maximum electric field is limited to prevent sparking, which might occur when the electric field is larger than $8 \times 10^5$ V/m.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of manufacturing an electrode comprising:
grounding an electrically conductive substrate;
tape casting an electrode structure onto the substrate, said electrode structure comprising a cathode material having dipolar particles; and
applying a voltage across the electrode structure to generate an electric field through the electrode structure to arrange the dipolar particles relative to one another within the electrode structure, wherein applying the voltage comprises connecting a doctor blade for use in tape casting to a power supply and applying the voltage across the doctor blade and the substrate.

2. The method of claim 1, wherein applying the voltage to generate an electric field arranges the dipolar particles to form one or more chains that are generally parallel to the electric field.

3. The method of claim 1, wherein the substrate comprises a layer of electrically conductive foil on which the electrode structure is formed.

4. The method of claim 1, wherein the doctor blade includes a plurality of teeth configured to impart a surface pattern onto the electrode structure.

5. The method of claim 1, further comprising drying the electrode structure in a vacuum.

6. The method of claim 5, further comprising heating the electrode structure to accelerate the drying of the electrode structure.

7. The method of claim 6, wherein heating the electrode structure comprises heating with a laser.

8. The method of claim 1, further comprising vibrating, simultaneously with applying the voltage, the electrode structure to facilitate the arranging of the dipolar particles relative to one another.

9. The method of claim 1, wherein the voltage is less than or equal to 1000 volts.

10. A system for manufacturing an electrode comprising:
a grounded electrically conductive substrate; and
a doctor blade configured for tape casting a paste onto the substrate to form an electrode structure, said electrode structure comprising a cathode material having dipolar particles, said doctor blade being electrically connected to a power supply for applying a voltage across the doctor blade and the substrate to generate an electric field through the electrode structure to arrange the dipolar particles relative to one another within the electrode structure.

11. The system of claim 10, wherein the substrate comprises a layer of electrically conductive foil on which the electrode structure is formed.

12. The system of claim 10, further comprising a heating element configured to heat the electrode structure.

13. The system of claim 12, wherein the heating element is a laser configured to heat the electrode structure.

14. The system of claim 12, wherein the heating element is configured to heat the doctor blade during the tape casting to heat the electrode structure.

15. The system of claim 14, wherein the heating element is embedded in the doctor blade.

16. The system of claim 10, furthering comprising a vibrator configured to vibrate the electrode structure.

17. The system of claim 16, wherein the vibrator is operatively coupled to the substrate to vibrate the substrate and the electrode structure thereon.

18. A method of manufacturing an electrode comprising:
grounding an electrically conductive substrate;
forming an electrode structure on the substrate, said electrode structure comprising a cathode material having dipolar particles;
applying a voltage across the electrode structure to generate an electric field through the electrode structure to arrange the dipolar particles relative to one another within the electrode structure; and
heating the electrode structure to accelerate the drying of the electrode structure.

19. The method of claim 18, wherein heating the electrode structure occurs simultaneously with applying the voltage.

20. The method of claim 18, further comprising vibrating, simultaneously with applying the voltage, the electrode structure to facilitate the arranging of the dipolar particles relative to one another.

* * * * *